July 5, 1960
R. A. LAMBERT
2,943,846
FOOD MIXER APPARATUS
Filed Jan. 14, 1958
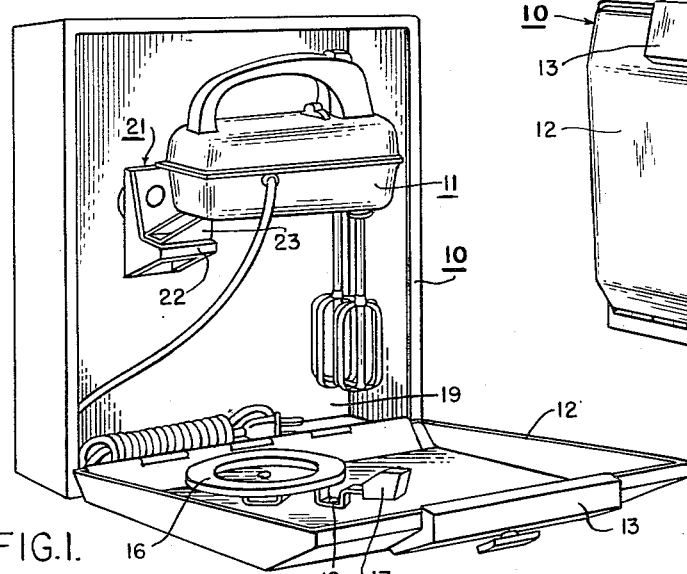
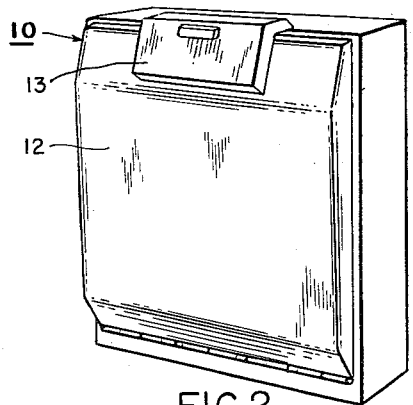
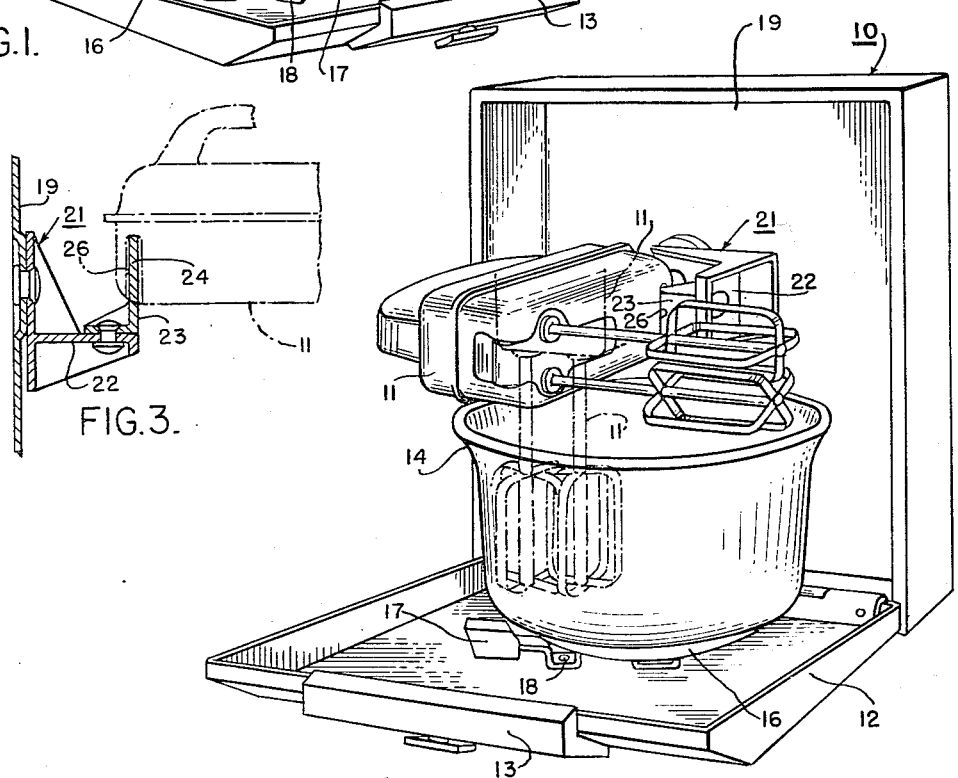
INVENTOR
RAOUL A. LAMBERT
BY *William J. Foley*
ATTORNEY

United States Patent Office 2,943,846
Patented July 5, 1960

2,943,846
FOOD MIXER APPARATUS

Raoul A. Lambert, Ludlow, Mass., assignor to Westinghouse Electric Corporation, East Pittsburgh, Pa., a corporation of Pennsylvania Filed Jan. 14, 1958, Ser. No. 708,777

2 Claims. (Cl. 259—108)

This invention relates to household mixers, and more particularly to a case for a portable, hand-held mixer of the type used in domestic kitchens for agitating, stirring and whipping foods. It is an object of this invention to provide an improved apparatus of this kind.

The most popular types of portable mixers comprise a power head having a carrying handle, speed control means and readily detachable beaters, and usually are of light, compact construction so that the mixer can be hand-supported during short periods of use.

When it is desired to stir or mix foods for extended periods, however, the portable mixer presents the disadvantage of requiring the user to constantly attend to the operation, while holding the mixer with increasing discomfort. A further disadvantage of the portable mixer is that some users are not altogether satisfied with storing the unit either inconspicuously or in a drawer where it may be subjected to damage by other objects.

In accordance with the present invention, a portable mixer of the class described and having an inboard power unit is mounted on the rear wall of a case by means of a support which is capable of pivotal movement about horizontal and vertical axes. The case has a front door upon which a seat for a mixing bowl is secured in a manner which permits free rotation of the bowl and adjustment of the bowl position with respect to the beaters. The support includes a bracket which allows ready detachment of the mixer from the bracket in order that the mixer can be hand supported for some cooking operations, such as stirring foods being cooked on a range. By this case construction it is easily possible to mount the case in a wall recess in order to obtain a built-in appearance without sacrificing kitchen work space. The case and mixer are of light weight and when the case is equipped with a carrying handle the combination is readily portable. This feature appeals especially to users who make infrequent use of a food mixer and prefer to store the assembly in a closet until it is to be used.

Accordingly, it is a further object of this invention to provide a case for a portable mixer which renders the mixer detachable for hand-held use and supportable by the case for use in the manner of a conventional heavy duty mixer, and which compactly encases the mixer in fixed position for safe and sanitary storage.

The foregoing and other objects are effected by the invention as will be apparent from the following description and claims taken in connection with the accompanying drawings, forming a part of this application, in which:

Fig. 1 is a front perspective view of the case and mixer, constructed and arranged according to the invention, showing the front door of the case in open position and the mixer exposed in stored position;

Fig. 2 is a front perspective view of the case of Fig. 1 with the door in closed position;

Fig. 3 is a side elevational view of the supporting member of this invention connected to the rear wall of the case; and Fig. 4 is a front perspective view of the case with the door in open position and showing a bowl positioned on a bowl seat and the mixer extending outwardly from the rear wall of the case. Full lines are used to illustrate the position of the mixer for receiving a bowl on the bowl seat, and dashed lines are used to show the mixer in operating position.

Referring to the drawings for a detailed description of the invention, the numeral 10 designates a box-like case for a portable food mixer 11. The case 10 has a front opening and a door 12 hingedly connected along its bottom edge for movement, as shown in Figs. 1 and 2, between open and closed positions, respectively. In order to retain the door 12 securely shut when it is in closed position a latch 13 is provided.

The door 12 of the case carries, on its inner surface, a bowl seat 16 that is attached to the door by a shift lever 17. The seat 16 is adapted to receive a mixing bowl 14 thereon in proper operating position relative the mixer 11 when the door is in its open position (see Fig. 4). The shift lever 17 supports the seat 16 for free rotation at one end of the lever, and is secured intermediate its ends to the inner face of the door 12 by a suitable fastener, such as a rivet 18. The rivet 18 also serves as a pivot at times when it is desired to position the mixing bowl 14 with respect to the mixer 11 by angular movement of the lever 17.

Pivotally connected to a rear upright wall 19 of the case 10 to one side of the middle of the wall is a support 21 for the mixer 11. The support 21 is constructed to permit movement of the mixer about vertical and horizontal axes. As best seen in Fig. 3, the support includes a generally L-shaped member 22 having a vertical leg thereof riveted to the rear case wall 19 in a manner which permits rotation of the member 22 about a horizontal axis. Also included in the support 21 is an L-shaped bracket 23 having a horizontal leg which is riveted to the horizontal leg of member 22 in order to permit rotation of the bracket 23 about a vertical axis. The bracket 23 has a vertically extending tongue portion 24 which is removably received in a vertical slot 26 formed in the end of the mixer housing opposite the beaters. It should be understood that this invention can be practiced by securing the support 21 to other stationary walls of the case 10 or by providing other mixer supporting means which are movable about vertical and horizontal axes.

The mixer has a self-contained, or inboard, power unit and is, therefore, capable of being used separate or apart from the casing as a hand-held mixer. While the casing is equipped with a unique support that enables the mixer to be used in the manner of a stationary, heavy duty mixer, the construction of the support permits the mixer to be readily detached therefrom.

One of the noteworthy features of this invention resides in the ability of the case 10 to be installed in a kitchen wall recess so that a neat, built-in appearance is obtained along with the saving of work space.

When the mixer 11 is to be operated, the door 13 is unlatched and moved to an open horizontal position wherein the door rests on a supporting surface. The mixer 11 is next swung on its support 21 about a vertical axis so that the mixer extends forwardly of the rear wall 19 and its beaters extend downwardly in close proximity to the bowl seat 16. In order to place a mixing bowl 14 on the seat 16 without interference from the beaters, the mixer 11 is rotated on its support 21 about a horizontal axis, and counter-rotated to operating position after the bowl 14 to be disposed in optimum position with respect to the mixer's beaters, as determined by the size of the mixing bowl. For hand-held use the mixer 11 is moved upwardly with respect to the case 10 so that the bracket tongue 24 is removed from the mixer slot 26. The reverse of the above procedure is followed to store the mixer 11 within the case 10.

From the foregoing it can be seen that an inexpensive case has been provided which permits compact storage of a portable mixer and which gives the user the option of detaching the mixer for hand-held use or of using the mixer in the manner of a heavy duty mixer.

While the invention has been shown in but one form, it will be obvious to those skilled in the art that it is not so limited, but is susceptible of various changes and modifications without departing from the spirit thereof.

What is claimed is:

1. The combination with a portable household mixer having an elongated power unit and at least one beater depending from one end of said power unit, of means for supporting said mixer in storage and operating positions and comprising an upright wall, and means carried by said wall and engageable with the end of said mixer power unit opposite said beater for supporting said power unit in a substantially horizontal attitude, said last-named means comprising a first pivotal connection providing swinging movement of said mixer about a substantially vertical axis and permitting said mixer to be moved to a storage position parallel to said wall and to an operating position normal to said wall, said last-named means further comprising a second pivotal connection permitting swinging movement of said mixer about a substantially horizontal axis extending longitudinally of the mixer, whereby said mixer may be tilted about said horizontal axis to facilitate placement of a mixing bowl beneath said mixer in operative relation to said beater.

2. The combination with a portable household mixer having an elongated power unit and at least one beater depending from one end of said power unit, of a casing having a plurality of upright walls and horizontal walls defining a storage container for said mixer, one of said upright walls being hingedly connected to an adjacent wall and being movable to an open position to permit access to said mixer, and means carried by another wall of said casing and engageable with the end of said mixer power unit opposite said beater for supporting said power unit in a substantially horizontal attitude, said means comprising a first pivotal connection providing swinging movement of said mixer about a substantially vertical axis and permitting said mixer to be moved to a storage position parallel to the wall of said casing opposite said hingedly mounted wall and to an operating position normal to said opposite wall, said supporting means further comprising a second pivotal connection permitting swinging movement of said mixer about a substantially horizontal axis extending longitudinally of the mixer, whereby said mixer may be tilted about said horizontal axis to facilitate placement of a mixing bowl beneath said mixer in operative relation to said beater.

References Cited in the file of this patent

UNITED STATES PATENTS

| | | |
|---|---|---|
| 1,741,044 | Whipple et al. | Dec. 24, 1929 |
| 2,323,945 | Strauss et al. | July 13, 1943 |
| 2,462,089 | Frisbie | Feb. 22, 1949 |
| 2,639,904 | McMaster et al. | May 26, 1953 |
| 2,789,798 | Brace | Apr. 23, 1957 |